W. STRAIT.
TRACTION MACHINE.
APPLICATION FILED DEC. 10, 1913.
1,237,970.
Patented Aug. 21, 1917.
4 SHEETS—SHEET 1.
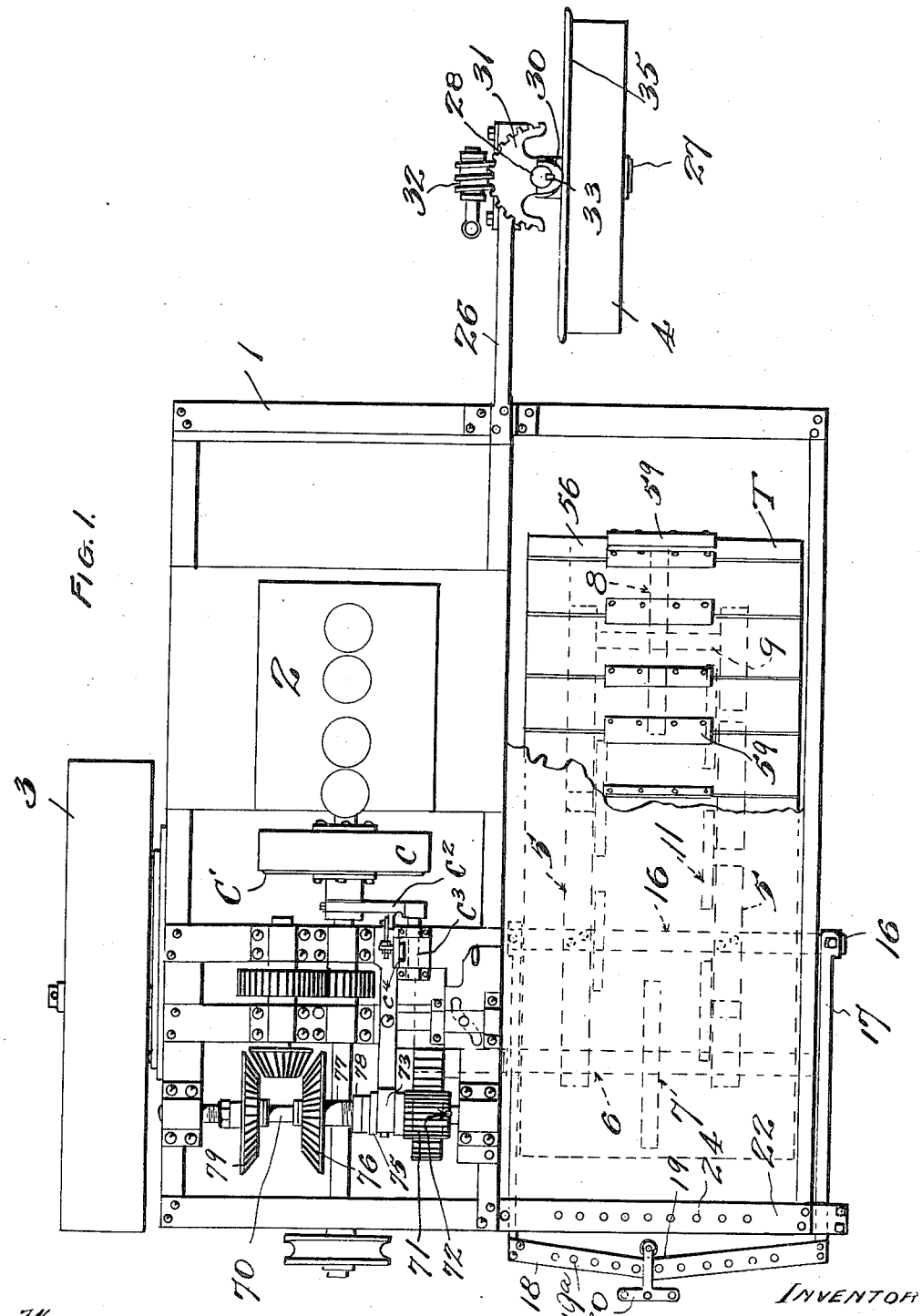
WITNESSES
C. K. Davis
M. A. Wood
INVENTOR
William Strait
by 
Attorneys

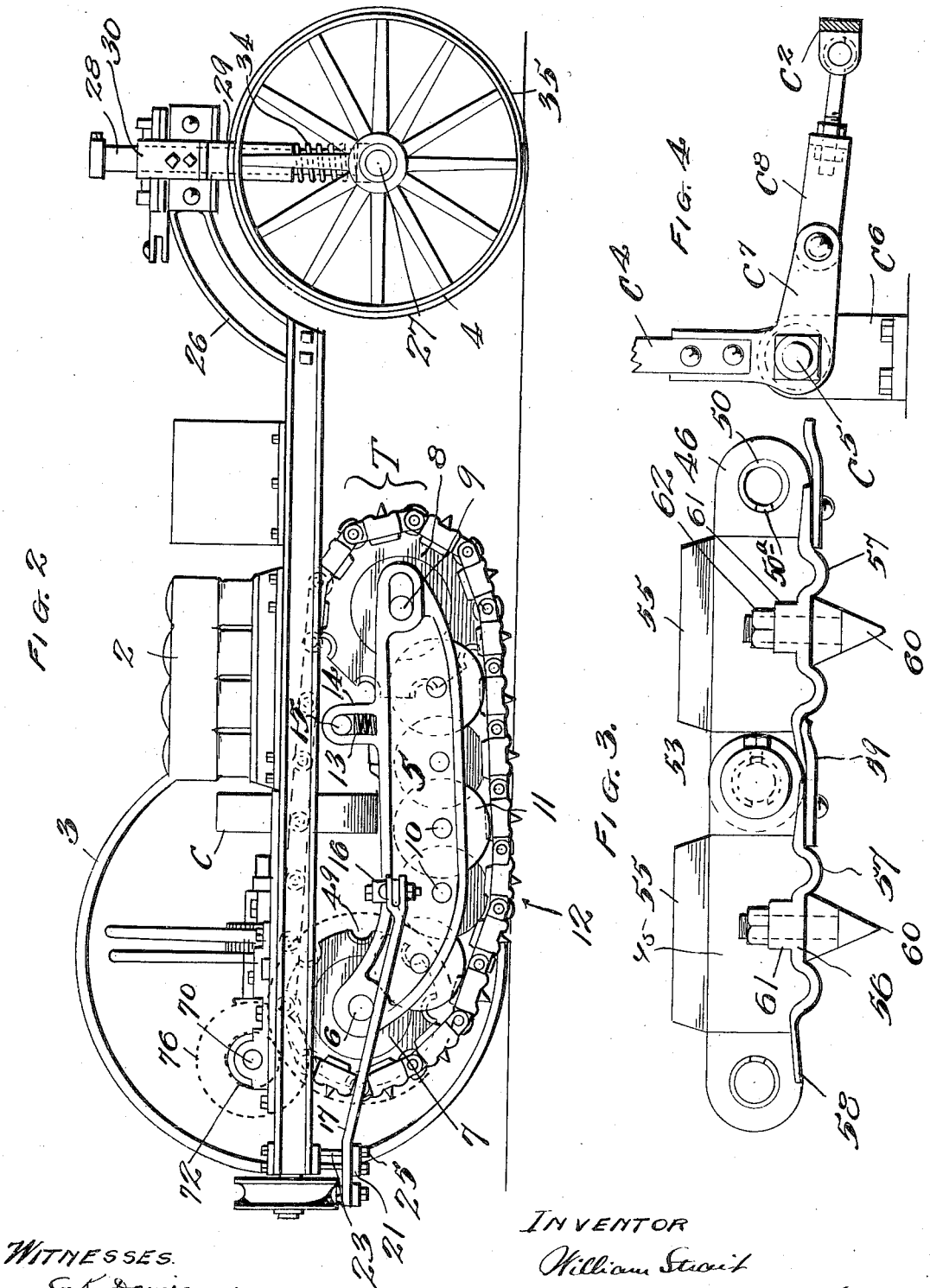

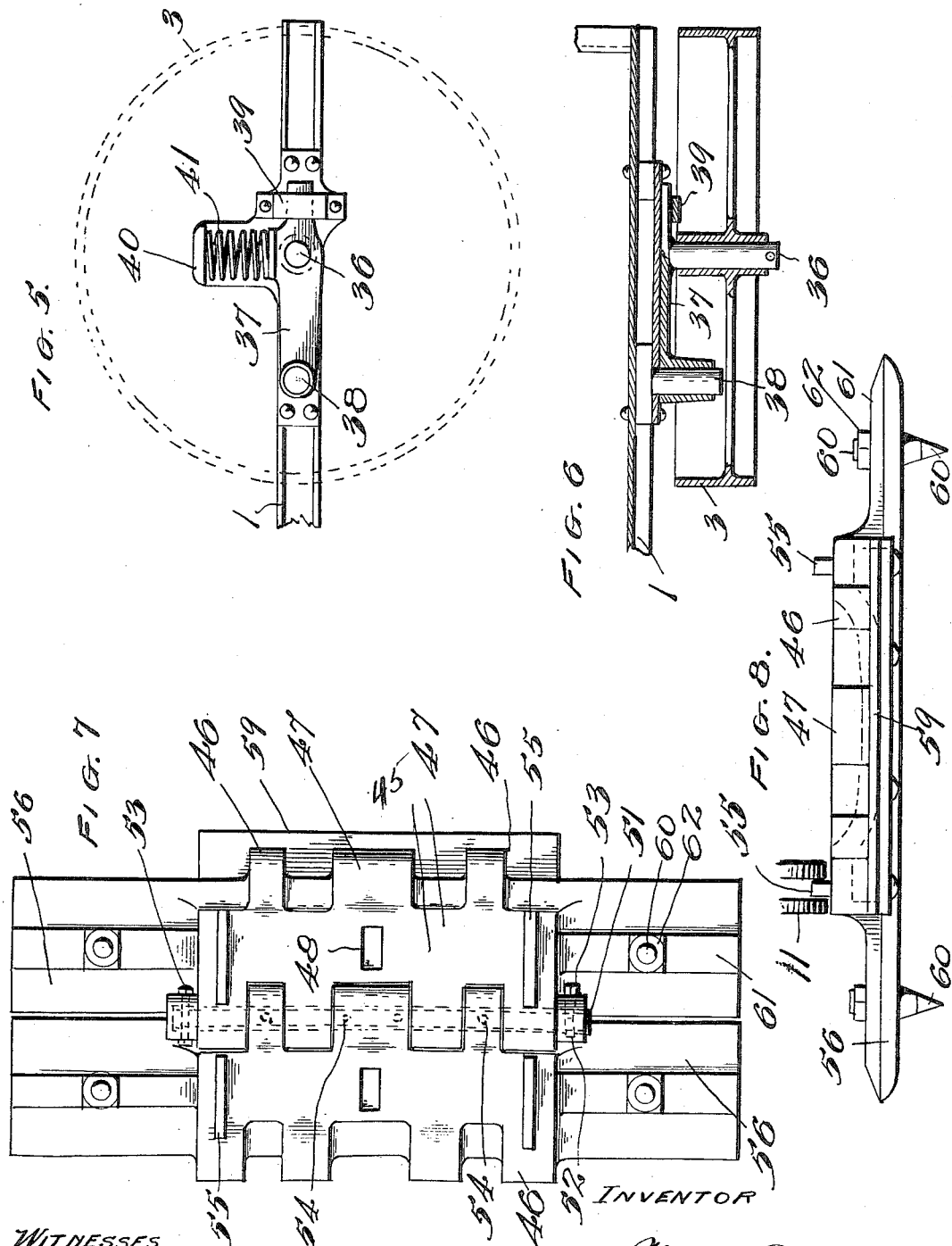

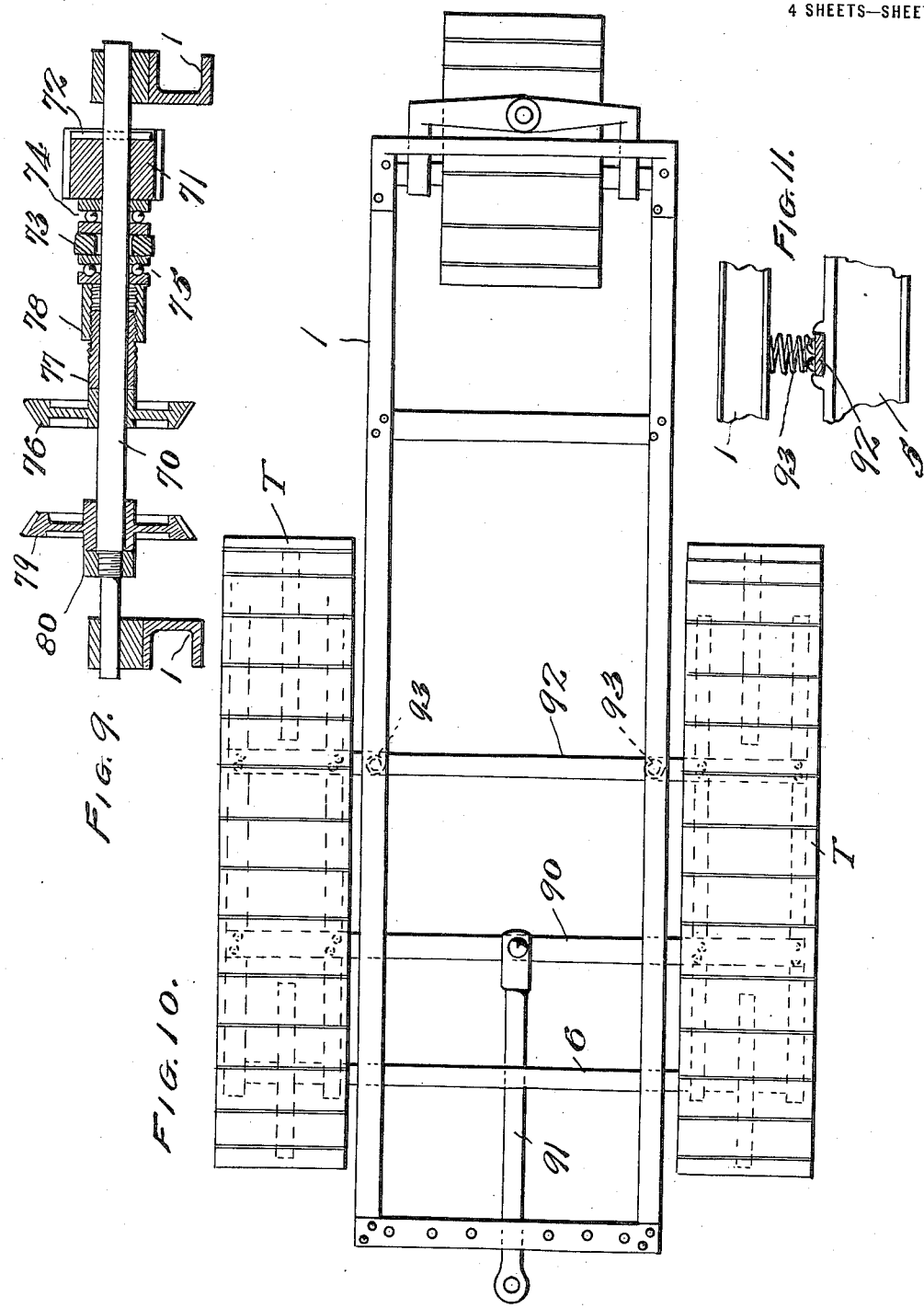

UNITED STATES PATENT OFFICE.

WILLIAM STRAIT, OF APPLETON, WISCONSIN.

TRACTION-MACHINE.

1,237,970.   Specification of Letters Patent.   Patented Aug. 21, 1917.

Continuation of application Serial No. 769,622, filed May 24, 1913. This application filed December 10, 1913 Serial No. 805,767.

*To all whom it may concern:*

Be it known that I, WILLIAM STRAIT, a citizen of the United States, residing at Appleton, Wisconsin, have invented new and useful Improvements in Traction-Machines, of which the following is a specification.

A principal object of this invention is to provide means for connecting the load to the tractor member or members proper rather than to the main frame of the machine. Another object is to employ a draw-bar of such shape and arrangement that the load will naturally seek its proper position behind the machine. Another object is to provide a tractor or belt frame pivoted at one end to the driving axle and having supporting devices for the ground stretch of the belt so arranged that the ground stretch is curved or bulged between its pulleys or sprockets. This curvature or bulge of the ground stretch is such that the normal ground contact point of the tractor proper is a relatively short distance in front of the axis of the driving shaft. By this arrangement the relatively long portion of the tractor forward of the ground contact point has a powerful leverage effect tending to support the rear end and the axle and main frame carried thereby. This leverage or counterbalance support of the frame is entirely flexible, so that if the forward part of the tractor encounters an obstacle it will rise and easily roll over the obstacle without exceptional or objectionable disturbance to the main frame. In connection with a tractor so constructed, I preferably arrange the draw-bar pull so that it comes approximately at or below the axis of the drive shaft. In this way the pull of the load assists in holding the forward part of the tractor near the ground and aids in the counterbalancing effect of the relatively long forward part of the tractor above mentioned. A further object is to provide suitable spring means between the tractor and the main frame, which may be used in some cases. A further object is to improve the construction of the belts or tractor chains employed in machines of this character. A further object is to provide in a preferred construction a machine having a single traction element in combination with a steering device arranged substantially in front thereof, together with a support for the opposite side of the main frame. This support may be a wheel or a belt, and it may or may not drive the machine, but, in a preferred construction, such supporting device is a non-driving, spring-mounted wheel; the advantages of which will be sufficiently described hereafter. In a preferred form of construction also, in which a single tractor element is employed, the steering device consists of a single wheel, spring-supported and suitably flanged for ground contact, and a machine so organized is especially adaptable for use as a cultivator for orchard and vineyard work, etc., although, of course, it may be employed to do plowing or hauling, or any other work up to the limit of its capacity.

The characteristics and advantages of the invention will be further pointed out hereinafter, so far as is necessary, in connection with a detailed description of the accompanying drawing which illustrates exemplifying structures embodying the invention. It is to be understood that the invention is capable of embodiment in many different forms.

Figure 1 is a top plan of a machine embodying the invention.

Fig. 2 is a side elevation of the same.

Fig. 3 is a side elevation, enlarged, of a portion of the chain or tractor belt.

Fig. 4 is a detail of the clutch lever and connection.

Fig. 5 is a detail side elevation of the supporting wheel member.

Fig. 6 is a horizontal section of the same.

Fig. 7 is an inner plan view of a portion of the tractor chain.

Fig. 8 is an end elevation of the same.

Fig. 9 is a section in the vertical longitudinal plane of the shiftable bevel gear shaft.

Fig. 10 is a top plan of a form of the machine employing two driving tractors.

Fig. 11 is a detail of tractor spring-mechanism therefor.

Referring first to Figs. 1 to 8 inclusive, reference character 1 designates a main frame carrying a suitable motor 2. In this form of the invention a single driving tractor, designated as a whole by the character T, is placed at or below one side of the main frame. The opposite side of the frame is supported in this embodiment by a wheel 3. The machine is steered by a steering wheel 4, preferably mounted in front of the tractor T, as shown. Where a machine is intended for relatively light cultivator work, as distinguished from the heaviest plowing, a preferred embodiment of such machine may comprise, as shown in Figs. 1 and 2, a single belt tractor with a supporting wheel such as 3, and a single steering wheel such as 4. But for other purposes, or in other embodiments of the invention evidently, a simple supporting tractor could be employed instead of the wheel 3, or such a tractor could also be a driving tractor and the steering element could be a chain or belt device instead of a single wheel 4.

The tractor proper comprises tractor frame members or radius members 5 pivoted at their rear ends upon the drive shaft or axle 6 suitably supported in bearings in the main frame. A drive sprocket 7 is carried by shaft 6 between frame members 5 and an idler sprocket 8 carried between the frame members at their forward ends upon a shaft 9.

In the lower part of tractor frame members 5 are mounted shafts 10 carrying belt-engaging rollers 11 to support the ground stretch of the belt. These rollers are so arranged that the ground stretch of the belt is outwardly curved or bulged between the sprockets, and, preferably, this bulge is accentuated at a certain point, as 12, this point lying a relatively short distance in front of shaft 6, so that normally the tractor will rest upon the ground at or about the point 12, the relatively long part of the tractor unit extending in front of this contact or pivot point acting as a lever fulcrumed at 12 to support the rear end of the tractor unit and the main frame through the axle 6. This support is entirely flexible, as evidently any increase of the load upon the main frame or the striking of an obstacle by the forward end of the tractor belt will cause the tractor frame members 5 to oscillate upon their pivot 6, and the ground contact point will then shift forward or back from the point 12. This arrangement enables the machine to ride over ground irregularities and obstructions, such as stones or logs, with great ease and flexibility and with minimum shock to the machine or its operator. This flexible counterbalancing action of the tractor unit will be assisted in some cases by a spring or springs 13. These rest upon the tops of frame members 5 and may be inclosed by loop-like guides 14. These guides may also embrace bar 15 carried by the main frame and resting upon the springs. The effect of these springs in yieldingly urging the front ends of the tractor toward the ground is evident without further explanation.

The words "lower-stretch" and "bottom-stretch", or in some cases "ground stretch" are employed to designate that part of the belt in proximity to the ground, or below and between the main belt-supporting pulleys. In referring to a "bulged" or "convex lower stretch" or "ground stretch" of the belt, I mean that this part of the belt is outwardly or downwardly bulged, or caused to lie at least at one point substantially below a line drawn between the bottoms of the main belt pulleys. The arrangement shown in Fig. 2 is one, and possibly the best, embodiment of this feature of my invention, but the bulge or convexity of the belt may be varied greatly within the invention.

To utilize the pulling effort of the machine to the greatest advantage I provide means to hitch the load directly to the tractor unit, this means consisting, in a single embodiment, of a cross-piece 16 secured to frame members 5; longitudinal members or links 17 connected at the ends of cross-piece 16 and a rear cross-rail or draw-bar 18 connected to the rear ends of link 17. This draw-bar 18 is preferably of curved or angular form as shown, providing an approximately central, rearwardly-curved part 19, so that link 20 to which any suitable load is to be connected will naturally tend to locate itself at part 19 of the draw-bar or rail 18, but in turning the link may run to one side or the other to best accommodate the pull to the momentary position of the tractor in relation to the load. The rail or bar 18 may be further provided with holes 19ª to receive coupling pins. The load may thus be hitched to a pin properly positioned to balance the pull in relation to the machine. The draw-bar frame is conveniently supported by means of a cross-rail 21 located below the upper rear main frame member 22 and connected to the latter by rods or bolts 23. The links 17 rest upon this cross-rail 21. Frame member 22 and rail 21 may also be provided with holes 24 for the insertion of coupling pins.

The construction and arrangement of cross-piece 16, links 17, rail 21 and draw-bar 18 are such that the line of pull between the tractor unit and the load is below the axis 6 of the tractor frame members 5. In this way, resistance of the load still further assists in holding down the front end of the tractor and insuring an ample ground contact and flexible support for the mechanism. The exact line of pull may be varied by raising or lowering rail 21, nuts 25 affording means to this end.

Steering wheel 4 is carried by a forward extension 26 of the main frame. This is preferably curved upward as shown in Fig. 2 to provide ample room for turning the wheel. The wheel axis 27 is carried at the lower end of stem 28 and this stem extends up through a bearing sleeve 29 connected to the frame extension. Above bearing 29 is mounted gear sleeve 30 carrying segmental worm gear 31, and this is engaged by steering worm 32 mounted in suitable bearings carried by the frame. Suitable steering hand-wheel and connections (not shown) are to be provided. Stem 28 has a splined connection 33 with segmental gear 31, so that stem 28 is caused to turn in accordance with the movement of the gear and may slide up and down in relation thereto, and also in relation to bearing sleeve 29. Between sleeve 29 and shaft 27, stem 28 is surrounded by a spring 34 which serves to absorb ground shocks. In this way efficient steering ground contact is maintained at all times. Wheel 4 may be provided with a flange 35 to increase its ground engagement if desired.

Supporting wheel 3 runs on an axle 36 carried by an arm 37 pivoted to the main frame at 38. The free end of this arm is guided in its oscillation by guide member 39 connected to the frame. A spring seat 40, also connected to the frame, forms an abutment for spring 41 engaging near the free end of arm 37. In this way, a spring support for the main frame in relation to wheel 3 is provided, and thus in connection with the flexible tractor support and flexible steering wheel support a complete flexible three-point suspension for the machine is furnished, enabling it to adapt itself to all ground conditions.

The links of the tractor chain or belt comprise center portions 45 having at each end offset hinge-eyes 46. Preferably the central eyes 47 at one end of the links are made wider than the others to insure ample strength in the direct line of pull. In the center line of the links are formed sockets 48 to receive the sprocket teeth. The central eyes or links 47 of the chain links are also rounded to fit the rounded sockets 49 between each pair of teeth of the sprocket. Preferably, there are on one end of each link a greater number of lugs than on the other, or else the total length of said lugs in the transverse direction of the links is greater on one side than on the other. Within these eyes 46, at the right-hand ends of the links, as seen in Fig. 7, or that is in the eyes which together constitute the shortest length of bearing surface, are placed bushings 50, which are preferably open at one side, and therefore easily inserted and removed. The links are provided with lugs 50ᵃ, which enter the slots in bushings 50 and prevent the bushings from turning. The bushings may thus be made sufficiently loose to be easily inserted and removed. The hinge pins 51 pass through these bushings and also engage the unbushed holes in the intermediate eyes of the other link. The engagement of the pins with the unbushed eyes having a greater total bearing surface than the bushed eyes, causes the pins to remain stationary in respect to the unbushed eyes and to turn in the bushings, and consequently all wear is taken by the bushings and when worn out they can be easily replaced with new ones. The hinge pins are held in place by collars or caps 52, secured by pins or set screw 53. These hinge pins may also be made hollow and lubricant supplied within them in any suitable way, and this lubricant distributed to the bushed eyes by oil holes 54.

To provide lateral guides for the belt, the center portions 45 of the links are provided with flanges 55 near the sides. Rollers 11 carried by tractor frame members 5 are arranged to run on the smooth surfaces of the links at opposite sides of flanges 55, as clearly shown in Fig. 8. In this way, tendency of the belt to shift laterally in respect to the tractor unit in turning is taken care of.

To insure ample ground contact the chain links are provided with lateral extensions 56 and these are preferably provided with corrugations to increase their strength and pulling effect for a given weight. The ends 58 of these extensions on adjacent links closely abut as shown in Fig. 3. To protect the hinges, guard-pieces 59 are connected to the center part of each link and extend substantially under the hinge pins. These guards extend each under the central end portion of the bottom of the adjacent link, as clearly shown in Fig. 3, and thus a continuous overlapping protection is provided below the hinges to prevent access of dirt to them. This protection is such that the guard members 59 continue to overlap during the bending of the chain as it passes around the sprockets and thus the hinges are protected at all times without the danger of dirt jamming between the links.

To still further increase the ground contact of the tractor, for instance on ice or snow, spikes 60 may be removably inserted in eyes 61 provided in the link extensions and secured by nuts 62.

The engine is connected for driving by a clutch C' (Fig. 1). This is shifted by a yoke carried at the end of arm C², and this arm is guided for longitudinal movement by a bar C³ suitably carried in a guide-frame. Clutch lever C⁴ is fulcrumed at C⁵ to the support C⁶ carried by the frame. This lever has an angular extension C⁷ connected by an adjustable toggle link C⁸ with yoke arm C². When the lever is moved forward, the toggle link is straightened out and the clutch is, therefore, engaged very gradually but yet with great force, as may be desired.

The general arrangement of the gearing shown in Fig. 1, is described in my previous application Serial Number 769,621, filed May 24, 1913. The transmission mechanism includes a bevel gear shaft 70 (Figs. 1 and 9). Near one end, pinion 71 is secured rigidly to this shaft by a pin or key 72 passing through the shaft and a corresponding hole in the pinion. Shifter arm 73 is located between two thrust-bearings 74, 75. Bevel gear 76 has a screw-threaded sleeve 77 and in the screw-thread is an adjustable collar 78 bearing against thrust bearing 75. When shifter 73 is moved into position to engage gear 76 with its pinion, the gear may be suitably adjusted to properly engage the pinion by rotating adjusting collar 78. Bevel gear 79 bears against a nut 80 engaging a screw-thread on the shaft and when shifter 73 is moved to engage gear 79 with its pinion the gear may be adjusted to mesh properly by rotating the nut 80.

Fig. 10 shows another embodiment of the invention in which a tractor unit T is employed at each side of the main frame. In this case both the tractors are driven by drive shaft 6 and provision is made for connecting the load directly to the tractors by connecting a cross-piece 90 to the frame members of each of the tractor units. Draw-bar 91 is in turn connected to this cross-piece 90 near the center thereof and the draft line is arranged below the axle 6, as described with reference to Figs. 1 and 2. This cross-piece 90 may be also employed to connect the tractor units rigidly together in cases where it is not desired that they have independent spring action. Another cross-piece 92 may be provided and connected to the tractor frames, and springs 93 for the tractors may be arranged between this cross-piece 92 and the main frame, as shown in Fig. 11.

If the load were hitched to a fixed point on the machine, for instance to a coupling pin rigidly connected to the main or the tractor frame, a considerable strain would be thrown upon the machine and especially upon the steering wheel in turning. For instance, with plows in the ground and hitched to a fixed point on the machine, in turning there would be a tendency to move the plows bodily in the ground and this strain would have to be borne by the steering wheel and steering would be made correspondingly difficult. My laterally arranged draft rail or draw bar 18 previously described, upon which a link travels for connection to the load, affords means for relieving this strain because when the load is connected to this traveling link and the machine is turned, the connection point of the load will shift toward one side or the other, and consequently no added strain is thrown upon the steering apparatus in turning even when pulling plows or other ground-engaging implements. At the same time, the rearward curvature of the draft rail tends to properly locate the load when the machine is driven straight ahead or approximately so.

The structure shown in Figs. 1 and 2 provides three "points" of support for a tractor, the supporting points being, of course, the tractor belt, the steering wheel and the supporting wheel. The tractor belt with its frame constitutes a balanced supporting device for one side and end of the machine. That is, the long overhanging front end of the tractor frame having a fulcrum point upon the ground at a point shortly in front of the driving shaft balances and supports the weight of the rear end of the machine at that side so that the machine is there supported flexibly against ground shocks and to permit the driving tractor to conform to any irregularities of surface. This flexibly balanced support, in combination with the two other supporting points, permits all three of the supporting devices to rest firmly upon the ground no matter what the ground contour may be and irrespective of any limitations in the action of the spring or balancing devices employed. Evidently, this would not be true in case of a four-point support, for then the irregularities of the surface would often exceed the capacity of the springs or other flexible devices to compensate for such irregularities. The supporting wheel and steering wheel are further provided with spring means so that the machine is flexibly supported at all three points.

This application is a continuation of my previous application Serial Number 769,622, filed May 24, 1913, in respect to the general construction and arrangement of the driving tractor, its operative relation to the main frame of the machine and its spring-supporting and guiding means.

Reference is also made to my later application Serial Number 849,602, filed July 7, 1914.

I claim:

1. In a traction machine, the combination of a main frame, a drive axle thereon, a tractor frame pivoted on said axle and a tractor belt carried by said frame having a bulged lower stretch normally engaging the ground a relatively short distance in front of said axle, and draft means connected to the tractor frame.

2. In a traction machine, the combination of a main frame having a drive shaft, a tractor frame pivoted thereon, a drive sprocket on said shaft, a belt idler on the free end of said tractor frame, a belt passing around said sprocket and idler, belt supporting means constructed and arranged to produce a downwardly-bulged tread between said sprocket and idler, the curvature of the tread being accentuated at a normal ground bearing point located in front of said shaft a distance relatively small in relation to the entire length of the tractor unit, and draft means connected to the tractor frame.

3. In a traction machine, the combination of a main frame, a drive axle thereon, a tractor frame pivoted on said axle and a tractor belt carried by said frame having a bulged lower stretch normally engaging the ground a relatively short distance in front of said axle, draft means connected to the tractor frame, said draft means being constructed and arranged so that the draft line is below the pivotal axis of said frame.

4. In a traction machine, the combination of a main frame having a drive shaft, a tractor frame pivoted thereon, a drive sprocket on said shaft, a belt idler on the free end of said tractor frame, a belt passing around said sprocket and idler, belt supporting means constructed and arranged to produce a downwardly-bulged tread between said sprocket and idler, the curvature of the tread being accentuated at a normal ground bearing point located in front of said shaft a distance relatively small in relation to the entire length of the tractor unit, draft means connected to the tractor frame, said draft means being constructed and arranged so that the draft line is below the pivotal axis of said frame.

5. In a traction machine, the combination of a main frame, a tractor frame pivoted thereto and a draw-bar connected to the tractor frame.

6. In a traction machine, the combination of a main frame, a tractor frame pivoted thereto, a draw-bar connected to the tractor frame, said draw-bar having a rearwardly-convex portion to normally center the load behind the tractor but to permit it to shift laterally in turning.

7. In a traction machine, the combination of a main frame, a tractor mechanism oscillatably connected thereto, and draft means connected to said tractor mechanism.

8. In a traction machine, the combination of a main frame, a tractor frame connected thereto, a tractor belt carried by said tractor frame, a tractor driving shaft and draft means connected to the tractor frame, said means being constructed and arranged so that the draft line is below said shaft.

9. In a traction machine, the combination of a main frame, a tractor frame pivoted thereon, a tractor belt carried by the tractor frame, and draft means connected to said tractor frame.

10. In a traction machine, the combination of a frame, a motor, driving tractor means, steering means, a transversely arranged draft rail at the rear end of the frame, and a link for connection to the load mounted to slide freely upon said rail.

11. In a traction machine, the combination of a frame, a motor, a driving tractor, steering means, a transverse draft rail rearwardly convex near its center and a slidable link on said rail for connection to the load.

12. In a traction machine, the combination of a main frame, a tractor frame connected thereto, a tractor belt on said tractor frame, a motor and driving connections for said belt, a transverse draft rail connected to said tractor frame and a link slidably mounted on said rail for connection to the load.

13. In a traction machine, the combination of a main frame, a tractor frame pivoted thereon, a tractor belt carried by the tractor frame, a transverse draft rail connected to the tractor frame, said rail being bulged rearwardly near its center, and a traveling link mounted on said rail for connection to the load.

14. In a traction machine, the combination of a main frame, a tractor unit flexibly connected thereto and including a belt having a bulged lower stretch and draft means operatively connected with the tractor unit to cause it to deflect and vary the ground contact of the belt in accordance with variations in the draft.

15. In a tractor machine, the combination with a main frame, of a tractor unit including a belt having a bulged lower stretch to afford a shifting ground contact, a pivotal connection between the tractor unit and the main frame and draft means coöperating with the tractor unit to cause it to deflect and shift the ground contact in accordance with variations in the draft.

16. The combination with the frame and prime mover of the tractor, of a wheel journaled in the rear portion of the frame, an operative connection from the prime mover to said wheel, an arm having its rear end pivoted to the frame and extending forwardly with respect to said pivotal point, another wheel journaled with respect to the forward end of said arm, and a draw connection extending rearwardly from said arm.

17. The combination with the frame and prime mover of a tractor, of a wheel journaled in the rear portion of said frame, an operative connection from the prime mover to said wheel, an arm having its rear end pivoted to the frame and extending forwardly with respect to said pivotal point, a ground pressure device connected to said arm, and a draw connection extending rearwardly from said arm.

18. The combination with the frame and prime mover of a tractor, of an arm having its rear end pivoted to the frame and extending forwardly with respect to said pivotal point, a ground pressure device connected to said arm, and a draw connection extending rearwardly from said arm.

19. The combination with the frame and prime mover of a tractor, of a sprocket wheel journaled in the rear portion of the frame, an operative connection from the prime mover to said sprocket wheel, a pair of arms having their rear ends pivoted to the frame adjacent to the journals of said sprocket wheel, a connection between the forward ends of the arms whereby they are compelled to swing together, means for guiding the arms in their swinging movements, a wheel journaled between the forward ends of the arms, spring connections between the frame and the arms intermediate the pivots of the arms and the forward wheel, a draw bar, connections from the arms to the draw bar, and a chain meshed with both of the wheels.

20. The combination with the frame and prime mover of a tractor, of a sprocket wheel journaled in the rear portion of the frame, an operative connection from the prime mover to said sprocket wheel, a pair of arms having their rear ends pivoted to the frame adjacent to the journals of said sprocket wheel, another wheel journaled between the forward ends of said arms, spring connections from the frame to the arms at a point intermediate the pivotal connections of the arms and the forward wheel, a draw bar, operative connections from the arms to the draw bar, and a chain meshed with both of the wheels.

21. The combination with the frame and prime mover of a tractor, of a sprocket wheel journaled in the rear portion of the frame, an operative connection from the prime mover to the sprocket wheel, a pair of arms having their rear ends pivoted to the frame adjacent to the journals of said sprocket wheel, another wheel journaled with respect to the forward ends of the arms, a chain meshed with both the wheels, and a draw connection extending rearwardly from the arms at a point intermediate the pivotal connections of the arms and the forward wheel.

22. The combination with the frame and prime mover of a tractor, of a wheel journaled in the rear portion of the frame, an operative connection from the prime mover to said wheel, a pair of arms having their rear ends pivoted to the frame and extending forwardly with respect to the frame, another wheel journaled with respect to the forward ends of said arms, and a draw connection extending rearwardly from said arms commencing at a point intermediate the pivotal connections of said arms and the journals of the forward wheel.

23. The combination with the frame and prime mover of a tractor, of a wheel journaled in the rear portion of said frame, an operative connection from the prime mover to said wheel, an arm having its rear end pivoted to the frame and extending forwardly with respect to said pivotal point, another wheel journaled with respect to the forward end of said arm, and a draw connection extending rearwardly from said arm commencing at a point intermediate the pivotal point of the arm and the journal of the forward wheel.

24. The combination with the frame and prime mover of a tractor, of a ground pressure device connected to the frame, an arm having its rear end pivoted to the frame and extending forwardly with respect to said pivotal point, another ground pressure device connected to said arm, and a draw connection extending rearwardly from said arm.

25. In a tractor, a frame, an arm pivoted to the frame, a ground pressure device connected to said arm, and a draw connection connected to said arm and tending to move the ground pressure device downwardly when a draw is exerted on said connection.

26. In a traction machine, the combination of a main frame, tractor mechanism flexibly connected thereto, draft means extending rearwardly from the tractor mechanism, and means for vertically adjusting the draft means and supporting said draft means in adjusted position.

27. In a traction machine, the combination of a main frame, a tractor frame pivoted in relation to the main frame, a draw bar connected to the tractor frame, and means for adjusting the draw bar vertically and supporting said draft bar in adjusted position.

28. In a traction machine, the combination of a main frame, a tractor frame pivoted in relation to the main frame, a draw bar connected to the tractor frame and arranged so that the draft line is below the pivot center, and means for adjusting the draw bar vertically.

WILLIAM STRAIT.

Witnesses:
   D. M. SMITH,
   M. A. WOOD.